(No Model.) 2 Sheets—Sheet 1.
H. RASSBACH.
GAS TIGHT JOINT FOR REFRIGERATING APPARATUS.
No. 507,040. Patented Oct. 17, 1893.
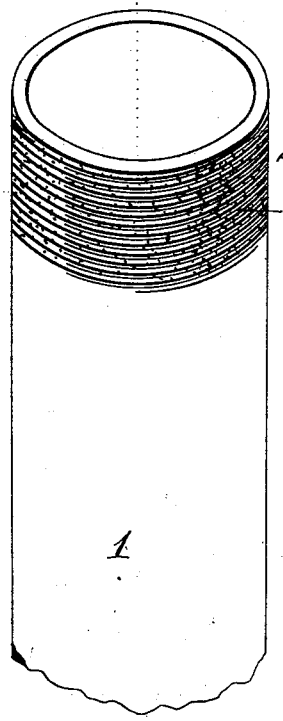
*Fig. 1.*
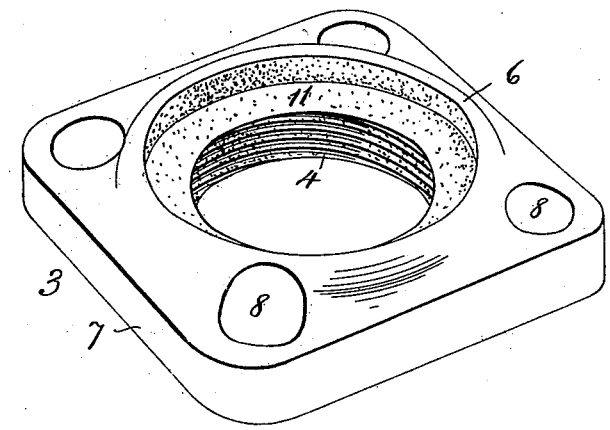
*Fig. 2.*
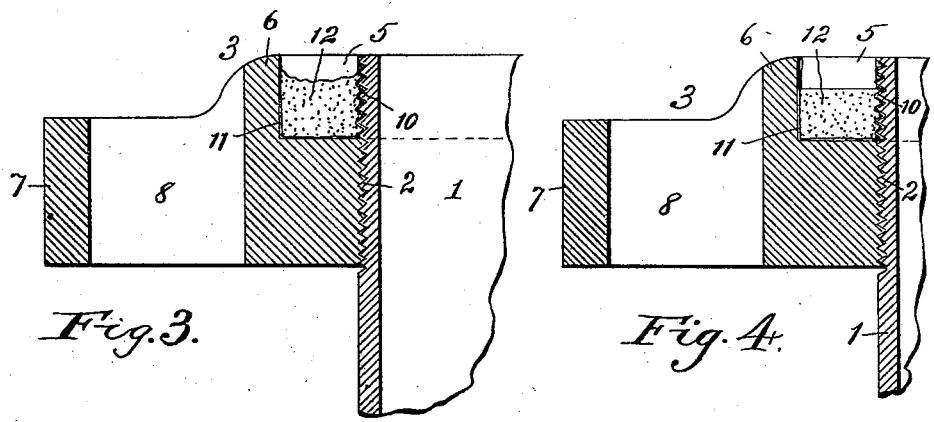
*Fig. 3.* *Fig. 4.*
Witnesses:
Chas. W. Parker
J. T. Parker
Inventor
H. Rassbach,
by H. N. Low
attorney

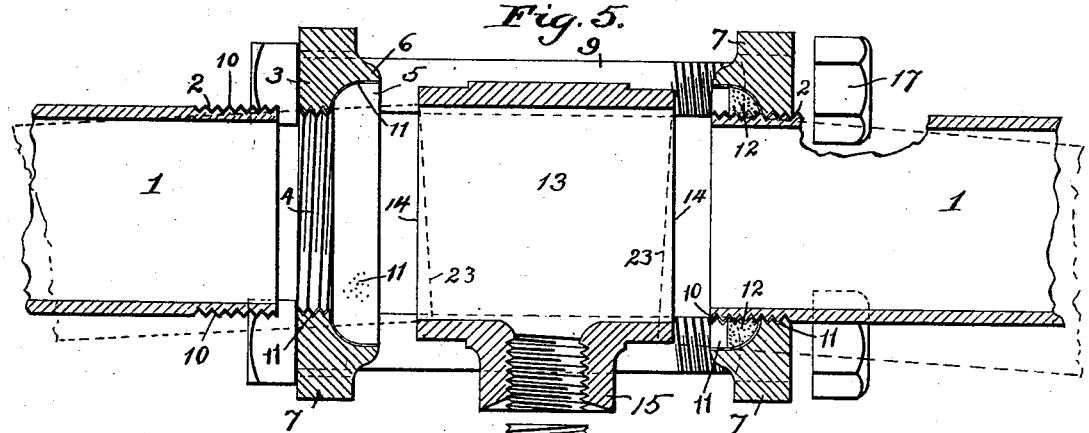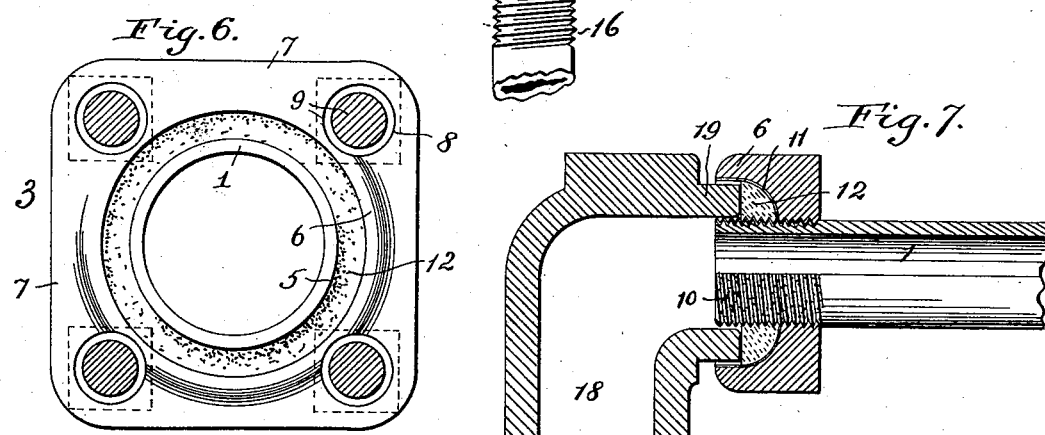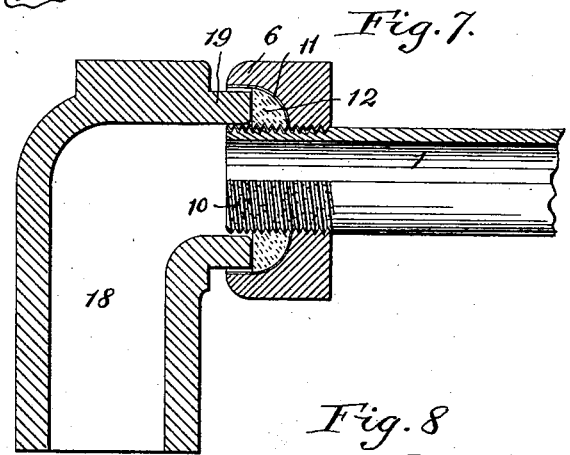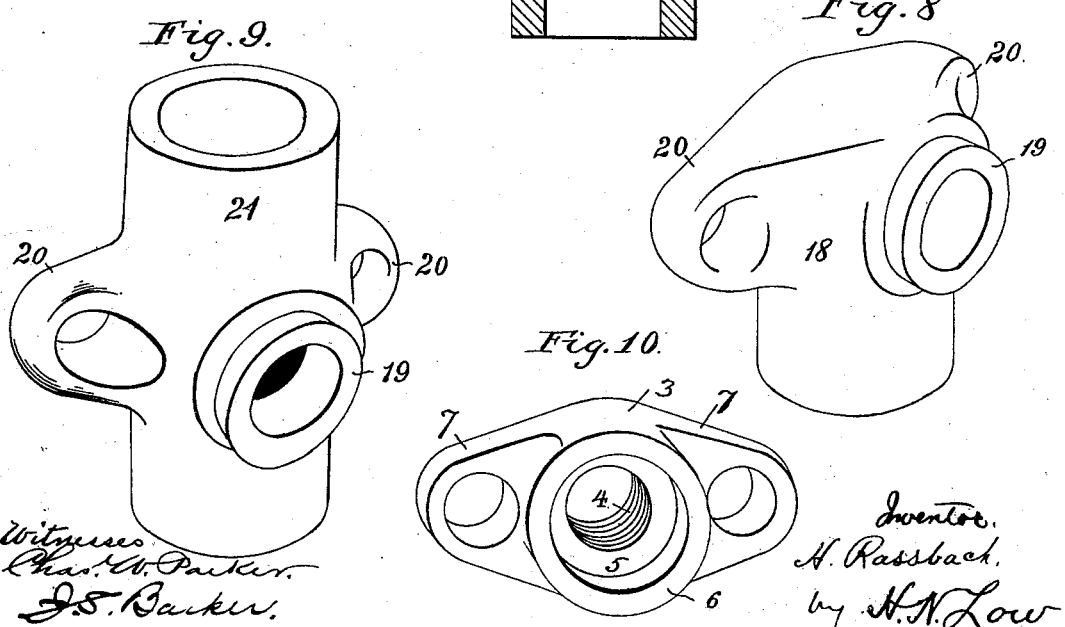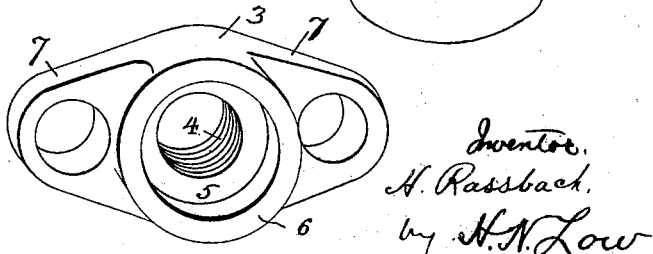

UNITED STATES PATENT OFFICE.

HERMANN RASSBACH, OF WASHINGTON, DISTRICT OF COLUMBIA.

GAS-TIGHT JOINT FOR REFRIGERATING APPARATUS.

SPECIFICATION forming part of Letters Patent No. 507,040, dated October 17, 1893.

Application filed April 22, 1893. Serial No. 471,462. (No model.)

*To all whom it may concern:*

Be it known that I, HERMANN RASSBACH, a citizen of the United States, residing at Washington, in the District of Columbia, have invented certain new and useful Improvements in Gas-Tight Pipe-Joints for Refrigerating Apparatus and other Purposes and Methods of Making the Same; and I do declare the following to be a full, clear, and exact description of the invention, such as will enable others skilled in the art to which it appertains to make and use the same.

Heretofore much difficulty has been experienced with apparatus in which gas is desired to be retained under pressure, in so constructing the machine as to prevent the escape of the confined gas. This is especially the case in an apparatus consisting of a considerable number of parts which have to be united with each other by joints. In refrigerating apparatus this difficulty is encountered in the highest degree, and much labor and time is required to be spent in so setting up the apparatus originally, and in maintaining an efficient inspection of it in operation, as to prevent the escape of gas through its numerous joints and the resulting waste and expense of running the plant of which such apparatus may form a part.

Refrigerating apparatus as ordinarily constructed consists of a considerable amount of piping, the individual pipes for which are supplied in more or less regular lengths, from which the apparatus is built up to the desired size and capacity by uniting the different lengths of pipe with each other through the medium of various forms of couplings. For this purpose various forms of joints and couplings have been devised with a view to obviating the difficulty referred to above, namely the leakage of gas through the joints of the apparatus, but such devices have not proved sufficient or perfect for the purpose, being either too complicated in construction, requiring too much labor and time in putting the apparatus together, or so uniting the different parts of the apparatus as to prevent them from being readily separated when it may be necessary, or failing in being sufficiently durable under the deteriorating influences of the gas which they are intended to confine and which often has a very destructive effect upon some of the packings which it has been attempted to use for these purposes.

It is the object of my present improvement to very much simplify the manner of putting together the different parts of a refrigerating or other apparatus, saving much time and labor, to so construct the joining couplings or parts as to make them economical of manufacture, to enable the pipes or other parts joined according to my improvement to be readily separable from each other whenever it may be necessary, and to render the apparatus absolutely gas tight in every part.

The parts constituting my improved joint may be variously shaped and constructed so that the joint is adapted for use in many situations and to connect pipes of various angles and relations to each other.

With such objects in view my invention consists in the parts and combinations thereof, and in the mode of uniting or combining the same, hereinafter more particularly set forth and claimed.

In order to make my improvement more clearly understood I have shown in the accompanying drawings means for carrying the same into practical effect without however limiting the invention in its various useful applications to the exact construction which, for the sake of illustration, I have delineated.

In said drawings—Figure 1 is a perspective view of the end of a pipe, screw-threaded and tinned. Fig. 2 is a similar view of a socket piece correspondingly threaded and interiorly tinned. Fig. 3 is a sectional view showing said parts connected, and having a solder ring cast in the socket piece, uniting the parts and interiorly sealing the joint between them. Fig. 4 is a similar view, showing said ring finished to a face normal to the axis of the pipe and adapted to act as a packing. Fig. 5 is a sectional view showing the mode of joining two lengths of pipe in line with each other, according to my improvement, the parts being shown as detached or separated from each other. Fig. 6 is an end view of one of said pipes provided with means for forming a joint with another pipe, or gland. Fig. 7 is a sectional view of an improved form of elbow coupling embodying my improvements. Fig. 8 is a perspective view of the said elbow coupling. Fig. 9 is a perspective view of an improved form of T coupling. Fig. 10 is a perspective view of a flanged socket piece adapted for use in connection with said elbow or T coupling.

I may premise my description by stating that heretofore coupling parts have been first screwed together and then soldered at the joint upon the outside, where it was desired to form a gas tight joint; but this involved much time and expense in setting up a plant. It is not secure as the gas will follow backward and outward along the screw-thread, and, being under a heavy pressure will frequently find an exit here or there through the thin external coating of solder. Very careful workmanship in soldering was the only safeguard and then the parts could not readily be separated for cleaning, repairs, or other necessary purpose. It has also been attempted to use separate washers or packings of soft metal, such as solder, but these have not been efficient in practice as it has often been found impossible to cause such packings or metal rings to fit with perfect accuracy on both faces when the joined pipes or other parts have been brought into line, or otherwise caused to occupy the proper relation to each other. The failure to cause both faces of such metal packing rings to come to an accurate and perfect bearing around their entire circumference has resulted in small leaks that would permit the escape of a considerable amount of gas when the latter was confined under heavy pressure. Rubber and other soft packings have also been employed, but with little success. They were not reliable for the reason that the gas or liquid conveyed in the pipes or other parts so joined would in many cases soon destroy or deteriorate the packing or change its nature so as to render it stiff or incompressible, and incapable of making a gas tight joint.

Great care in setting up plants in which the above mentioned appliances have been employed has been necessary, and constant inspection and repair afterward have been entailed.

By my improvement the above mentioned defects and difficulties are done away with. According to my invention the metallic ring or packing against the face of which the separable joint is made, itself constitutes the solder which seals the screw thread-joint at the end of the pipe or conduit. The solder is thus applied internally, and all pressure, whether of the clamping bolts of the joint or of the confined gas or liquid, only tends to make the sealing more effective.

In carrying my improvement into effect I prefer to proceed as follows, reference being had to the accompanying drawings: The end of a pipe or conduit, or chamber, 1 with which a joint is to be formed is provided with a screw-thread 2. A flanged socket piece 3 is provided with a corresponding screw-thread 4 adapted to fit the thread 2. Said socket piece is formed with an annular recess or socket 5 which is contiguous to the screw-threaded opening and is bounded by a circular flange 6. The clamp-flanges of said piece are indicated at 7 and are formed with suitable holes 8 through which may be passed clamping bolts 9 by which the coupling may be effected. Other clamping means may however be employed for this purpose. The screw-thread 2 and the interior of the piece 3 are then tinned as indicated at 10, 11, such tinned surface being preferably applied to the socket 5 and to the screw-thread 4. The piece 3 is then screwed upon the part 1 until the end of the latter is about flush with the end of the flange 6. The parts are then set upon end and a solder, preferably of the proportion of half lead and half tin, is poured into the groove or socket 5 to the depth of a quarter of an inch more of less. During or immediately before this operation the parts 1 and 3 are heated to such degree that the said solder, which will be in the form of a ring 12, will intimately unite with the tinned surfaces 10 and 11, completely sealing the joint between the screw-threads 2 and 4. The pipe 1 is then mounted in a suitable lathe, or has the supports of a boring tool clamped upon it, so that the outer surface of the solder ring 12 may be bored or turned off to a flat face exactly transverse to the axis of the pipe 1. The device is then ready for use.

In uniting two pipes in line with each other I prefer to proceed as shown in Fig. 5. The two pipes have their contiguous ends each provided with a socket piece 3 and soldering 12 as already described, and intermediate between the two solder rings I place a short section of pipe or gland 13 the ends 14 of which are cut off accurately transverse to its axis. This gland may also be formed with a neck 15 adapted to have a lateral pipe 16 connected with it by any desired form of joint. Such an arrangement is shown in Fig. 5 in which figure the joint between the parts 15 and 16 is illustrated as an ordinary screw-threaded and soldered joint, but the parts 15 and 16 may be so constructed as to be united by my improved form of joint. The socket pieces 3 are then drawn tightly together by the bolt 9 and nut 17, or by other suitable clamping device, so that all parts are brought accurately into line and the gland 13 caused to bear upon the rings 12 around their entire end or side surfaces. It will be observed that any imperfection or leak through the soldering will be closed by the clamping pressure of the bolts, and the slightest escape of gas prevented. Joints when thus made enable an apparatus to be quickly set up without any leak, are durable without limit, and require little or no subsequent attention.

In Figs. 7 and 8 I have shown an improved form of elbow coupling adapted to be joined, detachably but so as to be gas-tight, with a pipe which is provided with a suitable socket piece 3 and solder ring 12. This coupling 18 is provided at one end with an annular projection 19 which is adapted to fit around the end of the pipe 1 which is to be connected with it, within the flange 6 of the socket piece and to bear against the face of the solder ring 12. (Fig. 7.) The coupling 18 is provided with suitable flanges 20 (Fig. 8) adapted to be clamped to the corresponding flanges 7 of the socket piece.

In Fig. 9 I have shown an improved form of T-coupling adapted to be employed in detachably connecting by my improved joint, the end of one pipe with the side of a conduit. Such T-coupling is indicated at 21 and is provided with the annular projection 19 and flanges 20, which are of the same construction and mode of operation as already described in connection with Fig. 8.

In Fig. 10 I have illustrated a form of socket piece 3 suitable for use with the couplings 18 or 21; or this latter form of socket piece may be used for joining the ends of small pipes where only two clamping bolts would be necessary.

By this improvement, no matter whether or not the socket piece is tapped square in forming the thread 4, or whether the flanges 7 thereof are from that cause, or from warping or for other reasons, not square or exactly transverse to the ends of the pipe, the parts can nevertheless be brought into exact contact so as to make perfect joints, with the joined pipes exactly in line with each other (or at right angles to each other when the elbow or T-couplings are employed).

The recess, groove or socket 5 in the socket piece 3 may be made of any desired shape, but I prefer the rounded form shown, as it is much easier to perfectly clean and tin, and such shape (or other inclined or V-shape) tends to force the solder toward the pipe 1 under the clamping pressure.

Imperfect soldering cannot impair the effectiveness of the joint, as the clamping pressure will close any leak that may have existed between the threads of the two parts.

By the term solder in this specification I intend any suitable soft metal.

It is frequently desirable to join two pipes nearly in line with each other but not quite so, and set at a small angle from the parallel. It has heretofore been proposed to so unite pipes by providing a flexible coupling relying for its capacity of adjustment upon very thick and soft rubber washers. The rubber being unequally compressed, and being acted upon by the confined gas or liquid so as to be deteriorated, soon lost its efficiency, and more quickly deteriorated by reason of the fact of being under unequal pressure. By my improvement however such a joint can be readily made by sawing or filing off the end or ends of the gland 13 as indicated by the dotted lines 23 in Fig. 5. The said ends can then be seated accurately upon the solder ring or rings 12 and when the clamping bolts are tightly screwed up the pipes will be at the angle required and the joint thus made will be durable without practical limit and will be absolutely gas-tight.

Having thus described my invention, what I claim is—

1. In a joint the combination of a pipe or conduit provided with a socket piece, and a solder ring cast in the socket in contact with said pipe and soldering together the said parts, the said solder ring having an exposed face at or near the end of the pipe finished to a plane at right angles to the axis of the pipe and adapted to receive a detachable gland, coupling, or pipe and to serve as a packing therefor, substantially as set forth.

2. As a means for forming a gas-tight joint the combination of a pipe having a tinned screw-thread 2, a socket piece having a screw-thread 4, provided with a socket or groove 5 and tinned internally, and a solder ring 12 cast in said groove, soldering together said pipe and socket piece, and adapted to serve as a packing substantially as set forth.

In testimony whereof I affix my signature in the presence of two witnesses.

HERMANN RASSBACH.

Witnesses:
A. N. LOW,
C. E. MERRIAM.